(12) United States Patent
Oda

(10) Patent No.: US 6,717,147 B2
(45) Date of Patent: Apr. 6, 2004

(54) THERMO-SENSITIVE INFRARED RAY DETECTOR

(75) Inventor: Naoki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 09/939,674

(22) Filed: Aug. 28, 2001

(65) Prior Publication Data

US 2002/0040967 A1 Apr. 11, 2002

(30) Foreign Application Priority Data

Aug. 29, 2000  (JP) ........................ 2000-259796

(51) Int. Cl.⁷ .................................... G01J 5/20
(52) U.S. Cl. ........................ 250/338.1; 250/332
(58) Field of Search .................... 250/330, 332, 250/338.1, 338.3, 338.4, 340

(56) References Cited

U.S. PATENT DOCUMENTS

| | | | |
|---|---|---|---|
| 5,426,412 A | * | 6/1995 | Tomonari et al. ............. 338/18 |
| 5,589,689 A | * | 12/1996 | Koskinen ............... 250/339.01 |
| 6,034,369 A | * | 3/2000 | Oda ........................ 250/338.1 |
| 6,410,916 B1 | * | 6/2002 | Jost et al. ................... 250/332 |

FOREIGN PATENT DOCUMENTS

| | | |
|---|---|---|
| JP | A 10-209418 | 8/1998 |
| JP | 10-227689 | 8/1998 |
| JP | 11-248530 | 9/1999 |
| JP | A 2000-111397 | 4/2000 |
| WO | 00/23774 | 4/2000 |

* cited by examiner

*Primary Examiner*—Constantine Hannaher
*Assistant Examiner*—Timothy J. Moran
(74) *Attorney, Agent, or Firm*—Young & Thompson

(57) ABSTRACT

An infrared ray detector includes an array of pixels each including an infrared ray sensitive section having a first thermo-sensitive resistor and an infrared ray non-sensitive section having a second thermo-sensitive resistor. The second thermo-sensitive resistor is covered by an infrared ray reflector film. A pair of visors extending from the first thermo-sensitive resistor overhang the adjacent second thermo-sensitive resistor. A difference between the output signals from the first and second thermo-sensitive resistors is delivered as an output signal which cancels the fluctuation caused by the ambient temperature or Joule heat of the bias current.

11 Claims, 13 Drawing Sheets

THERMO-SENSITIVE INFRARED RAY DETECTOR

BACKGROUND OF THE INVENTION (a) Field of the Invention

The present invention relates to a thermo-sensitive infrared ray detector and, more particularly, to a thermo-sensitive infrared ray detector having a thermal isolation structure.

(b) Description of the Related Art

A thermo-sensitive infrared ray detector is generally used for detecting the temperature of an object by detecting infrared rays radiated from the object.

The thermo-sensitive infrared ray detector absorbs infrared rays radiated from the object at an infrared ray absorption film, installed therein and having an optical resonator structure, to convert infrared rays into heat. The heat generated by the conversion raises the temperature of a thermo-sensitive resistor, such as a bolometer film, forming a diaphragm having a micro bridge structure. The temperature of the object can be detected by the increase of the resistance of the thermo-sensitive resistor or bolometer film.

The thermo-sensitive infrared ray detector having such a thermal isolation structure generally involves a drift in the output signal due to a fluctuation of the ambient temperature, because it detects the infrared ray by measuring the temperature change of the bolometer film itself. The drift prevents an accurate measurement of the infrared ray by the thermo-sensitive infrared ray detector (hereinafter, may be referred to as simply "infrared ray detector").

For suppression of the drift in the output signal of the infrared ray detector caused by the fluctuation of the ambient temperature, it may be considered that a temperature control unit is associated with the infrared ray detector. However, this raises the cost of the infrared ray detector. A technique obviating the use of the temperature control unit is described in, for example, Patent Publications JP-A-11-248530 and -10-227689.

FIG. 1 shows the structure of the infrared ray detector described in JP-A-11-248530, and FIG. 2 shows the schematic circuit diagram of the amplifier disposed therein. The infrared ray detector includes an array of pixels formed on a substrate 82, each of the pixels including a metal bolometer 80, and a resistor 83 made of a material same as the material of the metal bolometer 80 and embedded in the substrate 82. The thermal isolation structure wherein the metal bolometer 80 is supported by a pair of struts 81 for thermal isolation of the metal bolometer 80 from the substrate 82 allows the metal bolometer 80 to change the resistance thereof upon irradiation of an infrared ray. On the other hand, the resistor 83 embedded in the substrate 82 exhibits a little temperature change upon the irradiation of the infrared ray.

The operational amplifier or inverting amplifier 84 having the resistor 83 as an input resistance (Rs) and the metal bolometer 80 as a feedback resistor (Rf) outputs a voltage signal representing a resistance ratio $R_F/R_S$. This configuration, wherein the resistance of the resistor 83 is used as a reference value, allows the cancellation of the fluctuation of the ambient temperature from the output of the metal bolometer 80, whereby installation of a temperature control unit is obviated in the infrared ray detector. In addition, since both the metal bolometer 80 and the resistor 83 are formed by using a thin film technique, the difference in the physical property between the metal bolometer 80 and the resistor 83 can be made minimum to thereby improve the accuracy of the measurement.

FIG. 3 shows a read circuit used in the infrared ray detector described in JP-A-10-227689, wherein the read circuit includes a chopper amplifier. The infrared ray detector includes in a single pixel a first thermo-sensitive resistor 101 and a second thermo-sensitive resistor 102 which constitutes a dummy resistor. The chopper amplifier includes first switch 104a, second switch 104b, third switch 104c, a capacitor 106 and an inverter 107.

The first thermo-sensitive resistor 101 and the dummy resistor 102 are connected to a current mirror 103, whereby the same current flows through the first thermo-sensitive resistor 101 and the dummy resistor 102. After the first switch 104a is activated (or closed) while both the resistors 101 and 102 pass the current, the output signal on a first node 105a is transmitted to one of the terminals of the capacitor 106, the other of the terminals of which is connected to the input of the inverter 107 through a second node 105b. By supplying a clock signal to activate the second switch 104b when the capacitor 106 receives the signal, the input and the output of the inverter are short-circuited, determining the operational point of the amplifier.

Thereafter, the first and second switches 104a and 104b are made open and the clock signal is supplied to the third switch 104c to activate the same, whereby the signal on the second node 105b is transmitted to the capacitor 106. The third node 105c allows a potential equal to a potential difference between the first node 105a and the second node 105b to be delivered to the third node 105c. The potential difference between the first node 105a and the second node 105b corresponds to the temperature rise which corresponds to the amount of the infrared ray irradiation. Thus, the signal on the third node 105c is delivered from the amplifier through the inverter 107.

FIG. 4 shows the infrared ray detector described in JP-A-10-227689, wherein a thermo-sensitive resistor 121 including a first bolometer film 131 and a dummy resistor 122 including a second bolometer film 132 are juxtaposed on a silicon substrate 123 in each pixel. The first bolometer film 131 is thermally isolated from the silicon substrate 123 by a cavity 126 disposed therebetween and formed by using a micro-machining technique, whereby the first thermo-sensitive resistor 121 is susceptible to a temperature rise caused by infrared ray irradiation. The second bolometer film 132 has a shape and dimensions similar to the shape and dimensions of the first bolometer film 131, and is located on the silicon substrate 123 via a support plate 124.

Both the first and second bolometer films 131 and 132 have similar temperature coefficient of resistances (TCR) so that the fluctuation of the ambient temperature does not cause any substantial change of the output of the infrared ray detector. The support plate 124 of the second bolometer film 132 may have small thickness as shown in FIG. 4 or may have a larger thickness as shown in FIG. 5, which shows a modification of the infrared ray detector of FIG. 4.

In the infrared ray detector shown in FIG. 4 or 5, if the second bolometer film 132 is irradiated by an infrared ray, the heat generated by the infrared ray irradiation in the second bolometer film 132 is readily transferred to the silicon substrate 123 acting as a heat sink, whereby the resistance of the second bolometer film 132 is not changed by the infrared ray irradiation. More specifically, the second bolometer film 132 is susceptible only to the fluctuation of the ambient temperature whereas the second bolometer film 131 is susceptible to both the infrared ray irradiation and the fluctuation of the ambient temperature. By combining this configuration with the signal read circuit of FIG. 2, while a DC output voltage component is made constant irrespective of the ambient temperature, the signal component caused by the infrared ray irradiation is superimposed on the DC output voltage component.

In both the conventional infrared ray detectors, as described above, although the metal bolometer 80 and the first bolometer film 131 are thermally isolated from the substrates 82 and 123, respectively, the dummy resistor 83 and the second bolometer film 132 are disposed substantially directly on the substrate acting as a heat sink. This configuration allows the fluctuation of the ambient temperature to be cancelled by using the output difference as described above; however, it is difficult to solve the problem that the self-heating of the resistors or bolometer films caused by a bias current may cause a fluctuation of the output voltage. This problem is detailed below.

The bias current is generally used in an on-chip read circuit installed in the infrared ray detector for reading the output signal from an array of pixels each including bolometer films (Refer to "The 8th International Conference on Solid-State Sensors and Actuators, and Eurosensors IX." 25–29, 1995 by Tanaka et al.).

If a pulse bias current passes through an infrared ray detector having a thermal isolation structure, the temperature of the bolometer itself rises sharply due to the Joule heat by self heating, and then falls toward the original temperature upon cut-off of the pulse bias current. The temperature difference of the bolometer in this case assumes several tens of degrees of Celsius. On the other hand, if an object having a temperature difference of about 0.1° C. with respect to the ambient temperature is detected by an infrared ray camera including an optical system having a F-number of F/1, the temperature of the bolometer rises by about 0.2 milli-degree Celsius (m° C.). In short, a bolometer-type infrared ray camera driven by a pulse bias current operates on a small signal component superimposed on a large self-heating component.

In the following description, the infrared ray detector described in JP-A-11-248530 is referred to. When the bolometer is subjected to infrared ray irradiation, the bolometer exhibits a change in the resistance thereof. The temperature dependency of the resistance of a metal is generally expressed by the following formula:

$$R = R_0 \exp(\kappa_M T) \quad (1)$$

wherein $R_0$ is a constant depending on the geometry of the bolometer, and $\kappa_M$ is the temperature coefficient of resistance (TCR) of the metal and thus determined by the species of the metal. In view of this formula, if the temperature $T_A$ of the substrate 82 fluctuates, the temperature $T_B$ of the bolometer 80 having a resistance of $R_B$ and the temperature $T_R$ of the resistor 83 having a resistance of $R_R$ are expressed as the following formulas:

$$T_R = T_A + \sum_{i=1}^{\infty} \Delta T_{Ai} \sin\left(2\pi \frac{t}{t_i}\right); \quad (2)$$

$$T_B = T_A + \sum_{i=1}^{\infty} \Delta T_{Ai} \sin\left(2\pi \frac{t}{t_i + \tau_{th}}\right) + \Delta T_{OBJ} + \Delta T_J; \quad (3)$$

$$\Delta T_{OBJ} = \frac{I_{in}}{G_{th}}\left(1 - \exp\left(-\frac{\tau_f}{\tau_{th}}\right)\right); \text{ and} \quad (4)$$

-continued $$\Delta T_J = \frac{V_B^2}{R_B} \frac{1}{G_{th}}\left(1 - \exp\left(-\frac{\tau_{ro}}{\tau_{th}}\right)\right), \quad (5)$$

wherein $\Delta T_{Ai}$ is a fluctuation of the ambient temperature having a period $t_i$, $\tau_{th}$ is a thermal time constant of the bolometer having a thermal isolation structure, $\Delta T_{OBJ}$ is a temperature rise of the bolometer having the thermal isolation structure caused by the thermal radiation $I_{in}(W)$ from the object, $\Delta T_J$ is a temperature rise of the bolometer having the thermal isolation structure caused by Joule heat, $V_B$ is a bias voltage, $G_{th}$ is the thermal conductance of the thermal isolation structure, $\tau_{r0}$ is a time length of the bias pulse, and $\tau_f$ is a frame time. The relationship $\tau_{r0} \ll \tau_{th}$ in the assumption of the literature by Tanaka et al. as recited above provides an approximation as follows:

$$\Delta T_J = \frac{V_B^2}{R_{B-}} \frac{\tau_{ro}}{C_{th}}, \quad (6)$$

wherein $C_{th}$ is a heat capacity of the temperature sensor including the metal bolometer 80 in the thermal isolation structure shown in FIG. 1. Since the temperature dependency of the resistance of the metal is expressed by formula (1), the output signal $V_{out}$ of the amplifier shown in FIG. 2 is expressed as follows:

$$V_{out} \propto \frac{R_F}{R_S} = \frac{R_B}{R_R} = \frac{R_{BO}}{R_{RO}} \exp(\kappa_B T_B - \kappa_R T_R). \quad (7)$$

Assuming an ideal case wherein the temperature coefficients of the resistance are same between the temperature sensors, i.e., $\kappa_B = \kappa_R$, the output signal Vout is expressed by:

$$V_{out} \propto \frac{R_{BO}}{R_{RO}} \exp(\kappa_B(T_B - T_R)). \quad (8)$$

It is to be noted in formulas (2) and (3) that the fluctuation period $t_i$ of the drift by the ambient temperature in the second term is generally far greater than the thermal time constant $\tau_{th}$. Thus, the following relationship:

$$T_B - T_R \approx \Delta T_{OBJ} + \Delta T_J \quad (9)$$

is obtained from equations (2) and (3).

In addition, since the temperature change $\Delta T_{OBJ}$ of the bolometer 80 caused by the thermal radiation from the object is far smaller than the temperature rise $\Delta T_J$ caused by the Joule heat, the relationship (9) is replaced by:

$$T_B - T_R \approx \Delta T_J = \frac{V_B^2}{R_B} \frac{\tau_{ro}}{\tau_{th}}. \quad (10)$$

As understood from the relationships (8) and (10), the output voltage $V_{out}$ depends strongly on the bias voltage $V_B$. Since the bias voltage $V_B$ is liable to change depending on the temperature fluctuation of the read circuit, the temperature difference $T_B - T_R$ changes in proportion to $V_B^2$ so long as the metal bolometer 80 has a thermal isolation structure and the resistor 83 is formed on the substrate 82, whereby the output voltage changes significantly irrespective of the circuit arrangement of FIG. 2. This problem is common to the infrared ray detector described in JP-A-10-227689.

In addition, in both the conventional infrared ray detectors, incorporation of the thermo-sensitive resistor and the dummy resistor in each pixel lowers the effective opening ratio expressed by a ratio of the infrared-ray sensitive area to the total pixel area, thereby decreasing the sensitivity to the infrared ray.

SUMMARY OF THE INVENTION

It is therefore an object of the present invention to provide a thermo-sensitive infrared ray detector which is capable of suppressing the drift in the output signal of the detector caused by the ambient temperature or the self heating of the resistors in the detector and has a higher sensitivity to infrared rays without incorporating a temperature control unit, such as a Peltier element.

The present invention provides a thermo-sensitive infrared ray detector including a substrate, first and second sections formed on said substrate and including first and second thermo-sensitive resistors, respectively, said first and second thermo-sensitive resistors having similar dimensions and thermally isolated from one another and from said substrate, and a shield member for shielding said second thermo-sensitive resistor against an infrared ray.

In accordance with the thermo-sensitive infrared ray detector of the present invention, the difference between the output signals from both the thermo-sensitive resistors includes substantially only a signal component representing the temperature change caused by the infrared ray incident onto the infrared ray detector, with the fluctuation of the ambient temperature being cancelled in the difference. Thus, an accurate measurement for the amount of infrared ray radiation can be obtained.

The above and other objects, features and advantages of the present invention will be more apparent from the following description, referring to the accompanying drawings.

PREFERRED EMBODIMENTS OF THE INVENTION

Figure 1:
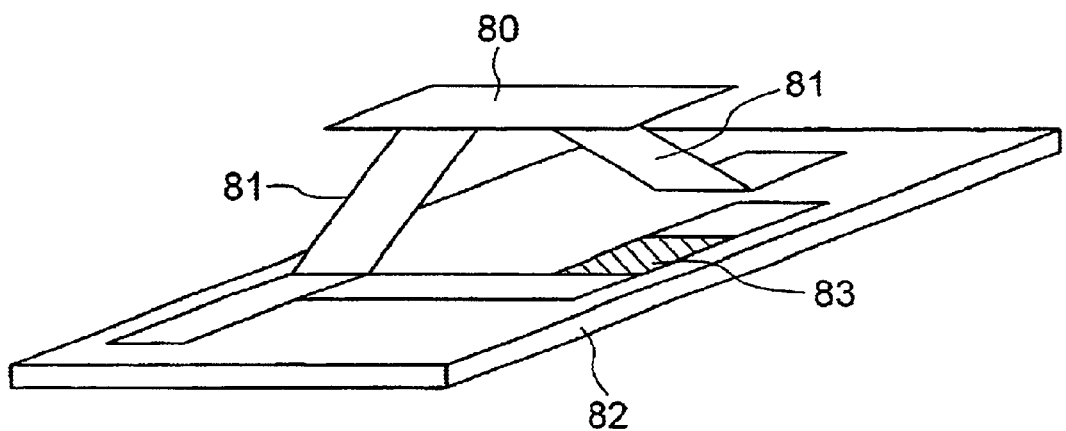
FIG. 1 is a perspective view of a conventional thermo-sensitive infrared ray detector.

Now, the present invention is more specifically described with reference to accompanying drawings, wherein similar constituent elements are designated by similar reference numerals.

Figure 6:
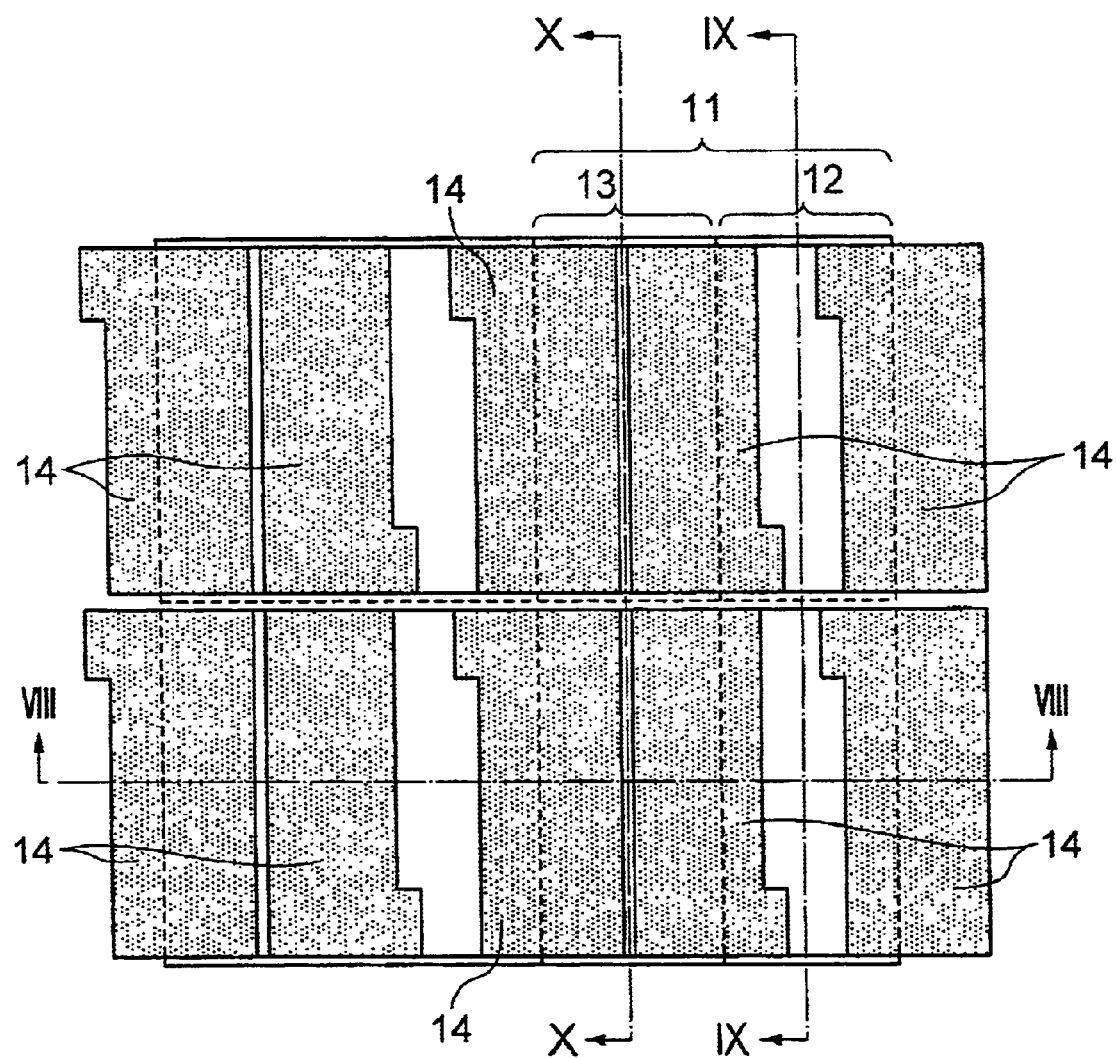
FIG. 6 is a top plan view of a portion of a thermo-sensitive infrared ray detector according to an embodiment of the present invention.

Referring to FIG. 6, there is shown 2×2 pixels 11 in an array of pixels of a thermo-sensitive infrared ray detector according to an embodiment of the present invention. Each pixel 11 includes an infrared ray sensitive section (first section) 12 and an infrared ray non-sensitive section (second section) 13 in pair, the latter being shielded by a pair of visors 14 which extend from adjacent first sections 12 to absorb an incident infrared ray. The visors 14 constitute a shield member in the infrared ray detector according to the present invention.

Figure 7:
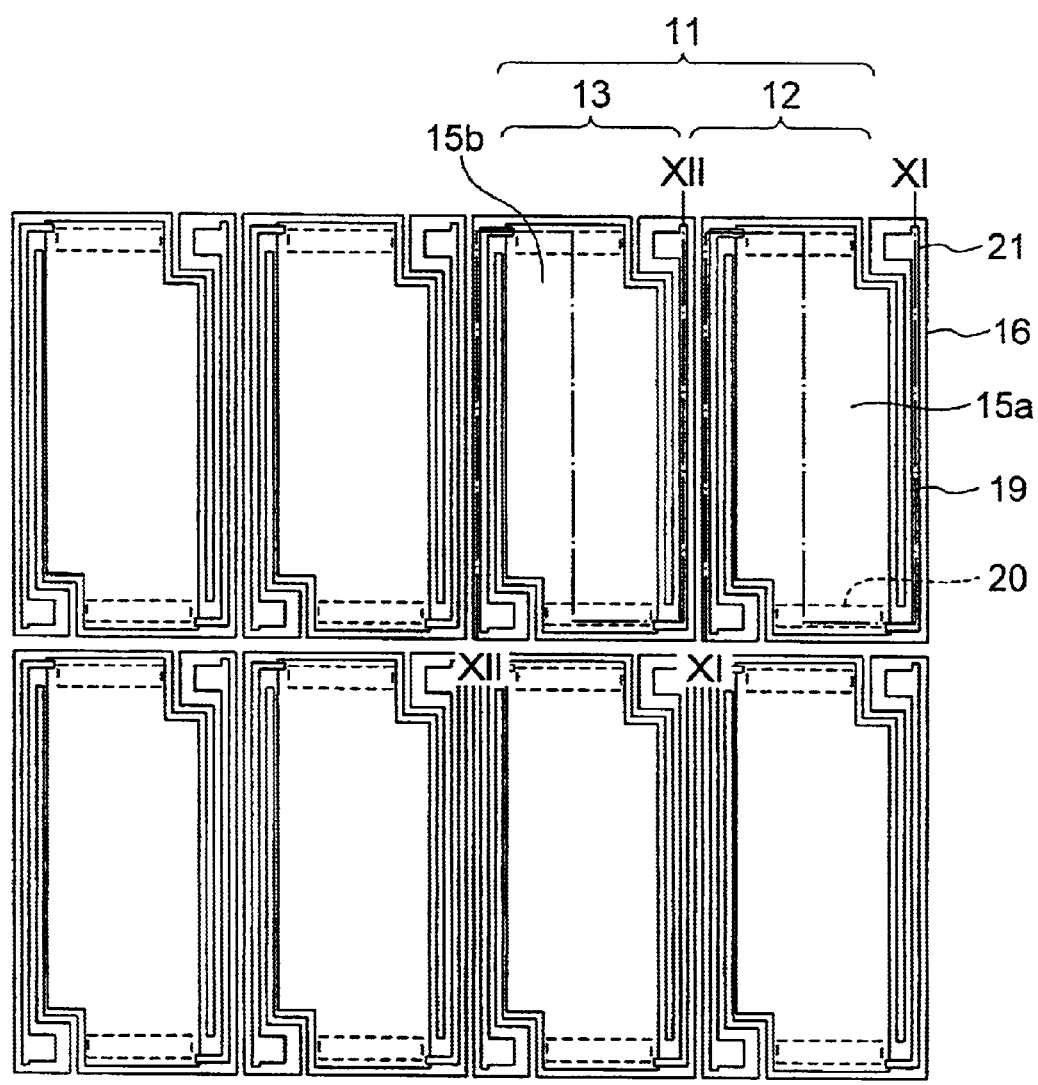
FIG. 7 is a top plan view of the portion shown in FIG. 6, with the shield member being omitted for depicting the detail of the pixels.
Figure 8:
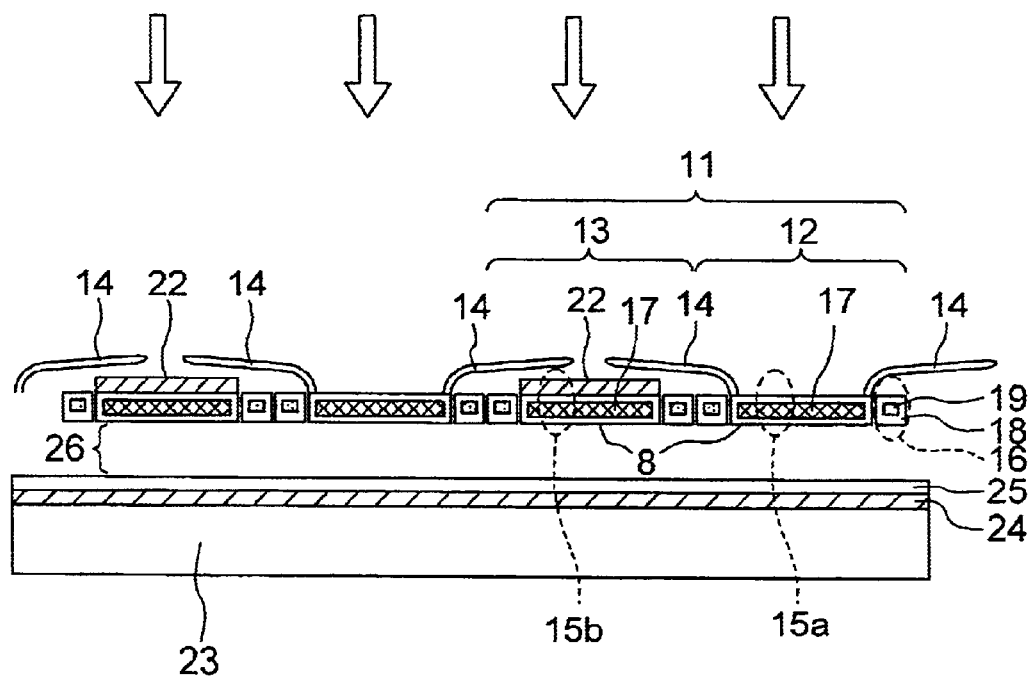
FIG. 8 is a sectional view taken along line VIII—VIII in FIG. 6.
Figure 9:
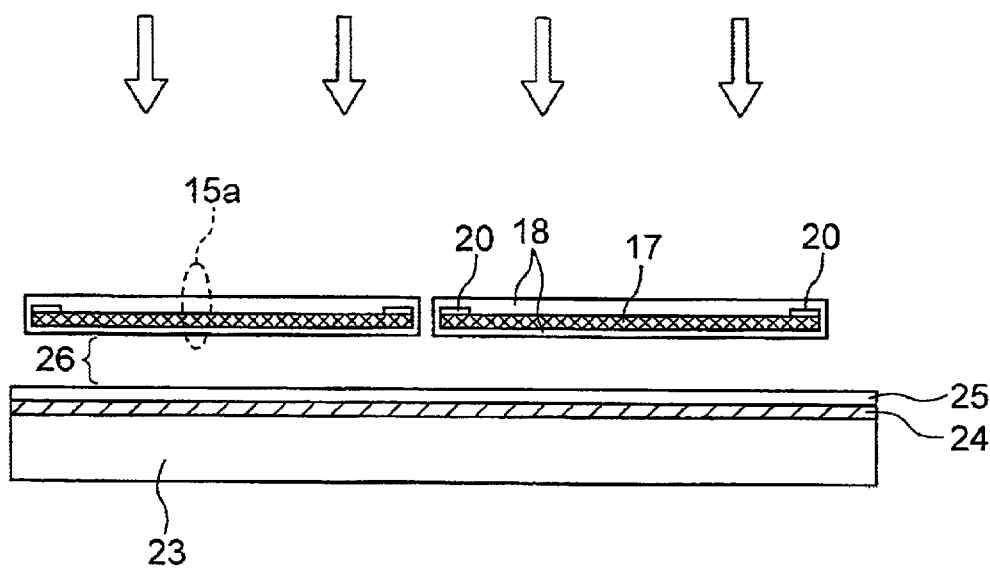
FIG. 9 is a sectional view taken along line IX—IX in FIG. 6.
Figure 10:
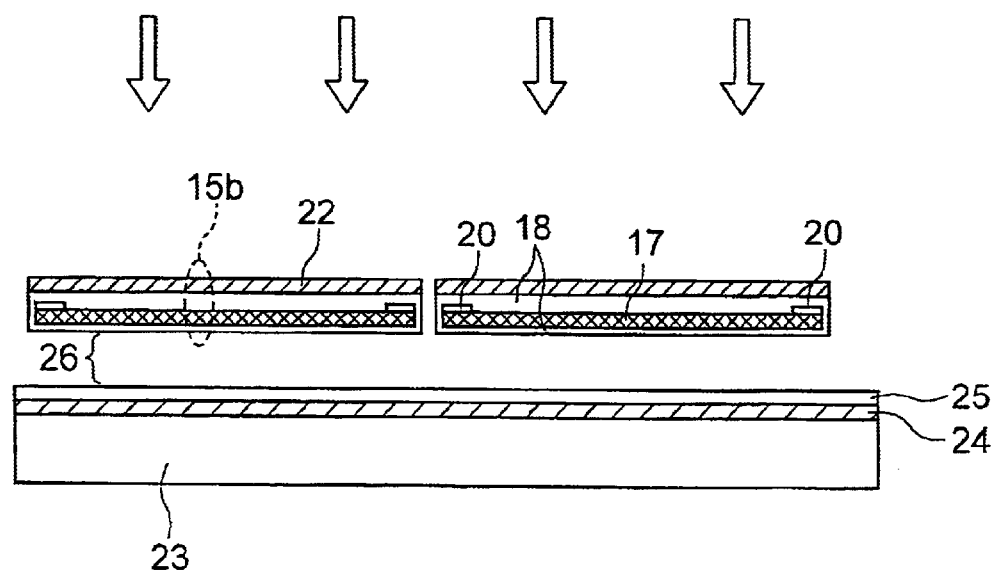
FIG. 10 is a sectional view taken along line X—X in FIG. 6.

Referring to FIG. 7, there is shown the 2×2 pixels 11 of FIG. 7, with the visors 14 being omitted for depicting the detail of the pixels. With reference to FIGS. 8 to 12 in addition to FIG. 7, the first section (or infrared ray sensitive section) 12 includes a first temperature sensor 15a therein, and the second section (or infrared ray non-sensitive section) 13 includes a second temperature sensor 15b, wherein each of the first and second temperature sensors 15a and 15b is supported by a pair of beams 16 and thus thermally isolated from each other and from the substrate 23. The second section 13 is covered by an infrared ray reflection film 22 which constitutes another shield member for shielding the second temperature sensor 15b against the infrared ray.

Figure 11:
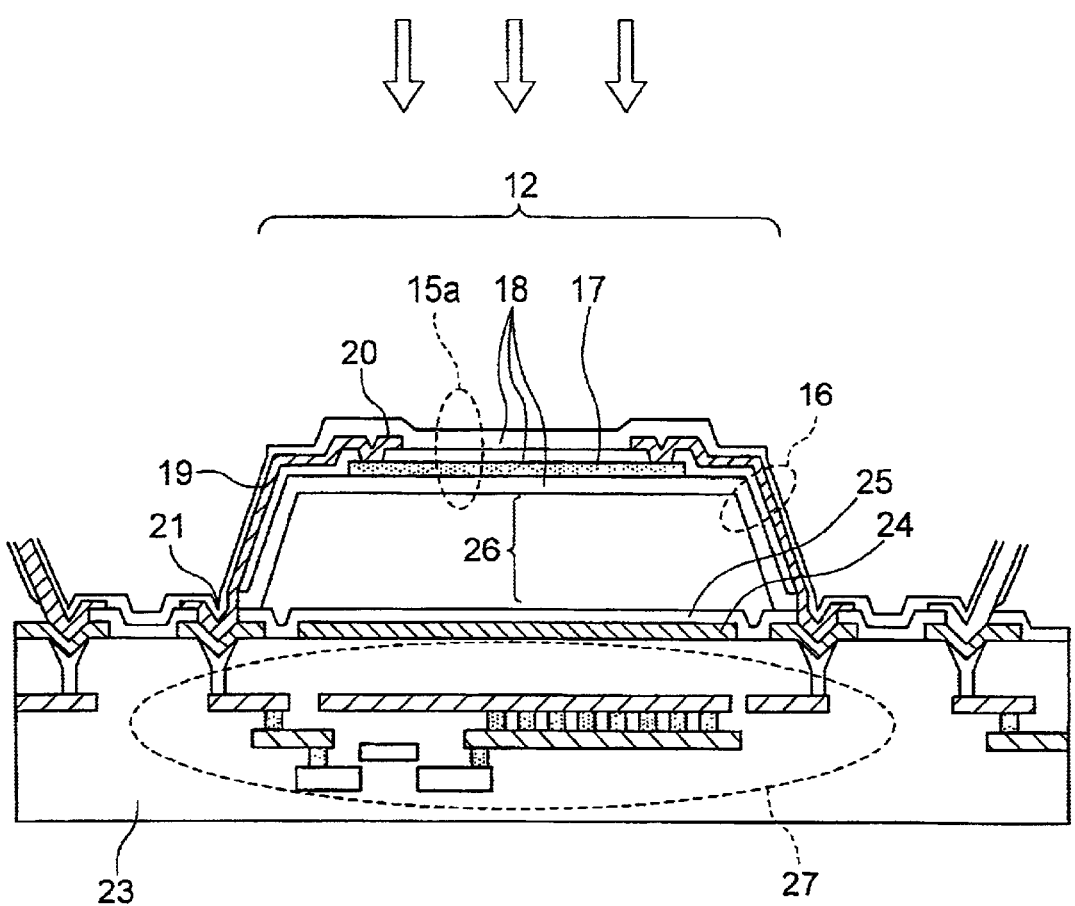
FIG. 11 is a sectional view taken along polygonal line XI—XI depicting a current rout in FIG. 7.
Figure 12:
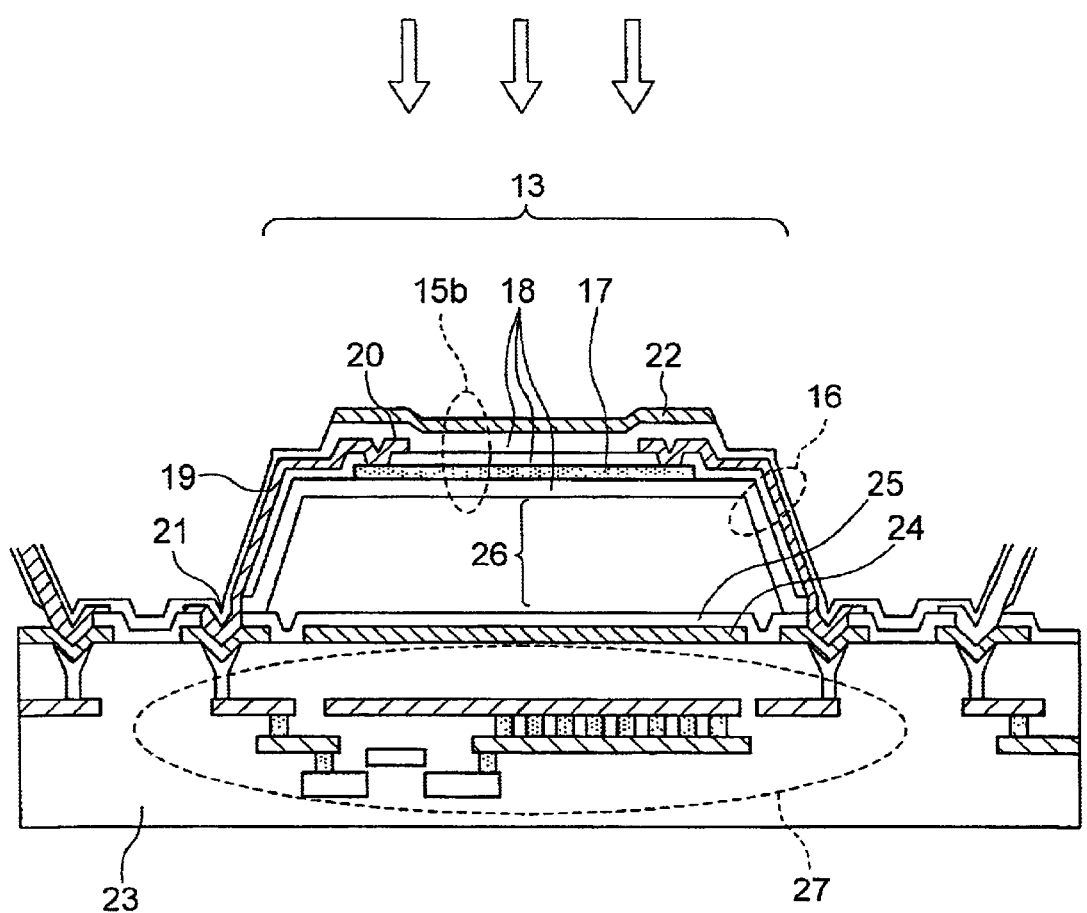
FIG. 12 is a sectional view taken along polygonal line XII—XII depicting another current route in FIG. 7.

More specifically, the infrared ray detector includes the substrate 23 made of silicon, on which a read circuit 27 is formed by a CMOS process. The read circuit 27 is schematically depicted in FIGS. 11 and 12. An infrared ray reflector film 24 made of Al having a thickness of 200 nm, for example, is formed on the silicon substrate 23, and a protective film 25 made of silicon oxide having a thickness of 200 nm is formed thereon. The infrared ray reflector film 24 may be made of another metal such as Ti or W or silicide thereof instead of Al, and the protective film 25 may be made of silicon nitride or silicon oxy-nitride instead of silicon oxide.

A cavity 26 is formed between the protective film 25 and the temperature sensors 15a and 15b by removing a patterned photosensitive polyimide film by using an ashing process at the final stage of the process. The photosensitive polyimide film filling the cavity 26 at the initial stage of the process is generally called sacrificial film, on which an array of infrared ray detectors are formed. Each pixel 11 is of a square having a 37 μm×37 μm size, for example, each of the temperature sensors 15a and 15b is around 11.5 μm wide and 35 μm long, and the beam 16 is around 2 μm wide and 29 μm long.

The temperature sensor 15a or 15b includes a 500-nm-thick protective film 18 made of silicon nitride having a property of absorbing an infrared ray having a wavelength of around 8 to 12 μm, for example, a 100-nm-thick bolometer film 17 made of an oxide of NiMnCo encircled by the protective film 18 and having a B-constant of around 3000, and a 100-nm-thick NiCr electrode 20. The beam 16 includes a 500-nm-thick protective film 18 made of silicon nitride and a NiCr interconnect line 19 encircled by the protective film 18. The beam 16 supports the temperature sensor 15a or 15b so that the temperature sensor 15a or 15b is thermally isolated from the substrate 23 by the cavity 26, thereby achieving a thermal isolation structure. The interconnect line 19 electrically connects the electrode 20 of the bolometer film 17 and the contact 21 of the substrate 23 together, the contact 21 being in turn electrically connected to the read circuit 27.

The bolometer film 17 may be implemented by metallic Ti film, polysilicon film, amorphous silicon film, amorphous germanium film, amorphous silicon germanium film, (La, Sr)MnO$_3$ film, YBaCuO film, vanadium oxide film, instead of oxide of NiMnCo. The material for the protective film 18 may be such capable of absorbing the infrared ray, e.g., silicon oxide, silicon carbide, silicon oxy-nitride, and a layered structure of films each including one of these materials. Material for the interconnect line 19 and the electrode 20 may be Ti or Ti alloy instead of NiCr so long as it has a lower heat conductivity. If polysilicon or amorphous silicon is used for the bolometer film, the interconnect line 19 and the electrode 20 may be made of silicon implanted with boron or arsenic at a higher concentration, which simplifies the fabrication process.

The infrared ray sensitive section 12 is associated with a pair of visors 14 made of silicon nitride having a thickness of 500 nm and capable of absorbing an infrared ray having a wavelength of 8 to 12 µm, the visors 14 extending from the respective edges of the first temperature sensor 15a toward the space above the infrared ray non-sensitive section 13 for shielding the same and the beam 16 against the incident infrared ray. The visor 14 absorbs the infrared ray directed to the area for the infrared ray non-sensitive section 13, and transfers the heat generated by the incident infrared ray to the bolometer film 17 of the first temperature sensor 15a. This configuration allows the area for the infrared ray non-sensitive section 13 to be effectively used for detecting the infrared ray, thereby improving the effective area ratio of the infrared ray detector.

In a concrete example, assuming that the gap between the visors 14 is 2 µm, the area of the visors 14 is 35 µm×35 µm, providing an effective area ratio of 89.5%. The visor 14 may be silicon oxide film, silicon carbide film, silicon oxy-nitride film or a layered structure of these films instead of silicon nitride film.

On the other hand, the infrared ray non-sensitive section 13 has an infrared ray reflector film 22 made of Al having a thickness of around 720 nm as a top layer thereof instead of the visors 14. The reflector film 22 reflects the infrared ray incident thereto through the gap between the visors 14, thereby suppressing the temperature fluctuation of the second temperature sensor 15b caused by the infrared ray irradiation. The infrared ray reflector film 22 and the visors 14 are arranged to have a specified space therebetween to form an optical resonator structure, thereby providing a higher absorption efficiency for the infrared ray.

The material for the infrared ray reflector film 22 may be another metal such as Ti or W or silicide thereof instead of Al, as in the case of the infrared ray reflector film 24. The infrared ray reflector film 22 has a specified thickness to have a heat capacity equivalent to, or more preferably substantially equal to, the heat capacity of the pair of visors 14, whereby both the temperature sensors 15a and 15b have similar temperature characteristics such as the thermal time constant and the thermal conductance.

A practical sample manufactured as the thermo-sensitive infrared ray detector having the above configuration included an array of 320×240 pixels in the detector. The typical resistance of the thermo-sensitive resistors was 40 kΩ, the peak-to-peak variation of the resistances of the thermo-sensitive resistors was 10% in the 15 mm×15 mm array, and the difference in the resistance between the sensitive section 12 and the non-sensitive section 13 disposed in a pixel was about 500 Ω. The resistance difference originated mainly from the contact resistance. In addition, the mean thermal conductance of the sections 12 and 13 having the thermal isolation structure was 1.5×10$^{-7}$ W/K, the mean heat capacity of the temperature sensors was 1.0×10$^{-9}$ J/K in the array, and the differences in these values between the sections in each pixel was within 2%. The bias voltage applied to these sections was 5 volts, with a pulse width of 30 microseconds.

In operation of the infrared ray detector of the present embodiment, a part of the incident infrared ray is absorbed by the protective film 18, bolometer film 17 and the visors 14 of the sensitive section 12, and the rest of the incident infrared ray passes these films, is reflected by the infrared ray reflector films 22 and 24 and again incident onto the visors 14 and the temperature sensor 15a of the first section 12 and then absorbed therein.

The absorbed infrared ray heats the temperature sensor 15a, and changes the resistance of the bolometer film or thermo-sensitive resistor 17 in the temperature sensor 15a. The resistance change is read by supplying a bias current thereto from the on-chip read circuit 27 as a voltage change. The bias current passing the thermo-sensitive resistor generates a Joule heat therein, raising the temperature of the temperature sensor 15a, which is read as the voltage change, as described before.

On the other hand, the non-sensitive section 13, having the temperature sensor 15b covered by the top protective film 22, does not absorb the incident infrared ray, thereby exhibiting no resistance change in the temperature sensor 15b. Thus, the bias current only generates a Joule heat whereby the output signal caused by the incident infrared ray is not read therefrom. The above facts can be formulated by the following relationships:

$$T_R = T_A + \sum_{i=1}^{\infty} \Delta T_{Ai} \sin\left(2\pi \frac{t}{t_i + \tau_{th}^R}\right) + \Delta T_J^B; \quad (11)$$

$$T_B = T_A + \sum_{i=1}^{\infty} \Delta T_{Ai} \sin\left(2\pi \frac{t}{t_i + \tau_{th}^B}\right) + \Delta T_J^B + \Delta T_{OBJ}; \text{ and} \quad (12)$$

$$\tau_{th} = \frac{C_{th}}{G_{th}}, \quad (13)$$

wherein $\tau_{th}^R$ and $\tau_{th}^B$ are the thermal time constants of the non-sensitive section 13 and the sensitive section 12, respectively, $\Delta T_J^R$ and $\Delta T_J^B$ are the temperature rises of the non-sensitive section 13 and the sensitive section 12, respectively, caused by Joule heat. In the equations (11) and (12), the fluctuation period (cycle) $t_i$ is typically far greater than the thermal time constants $\tau_{th}^R$ and $\tau_{th}^B$.

Figure 2:
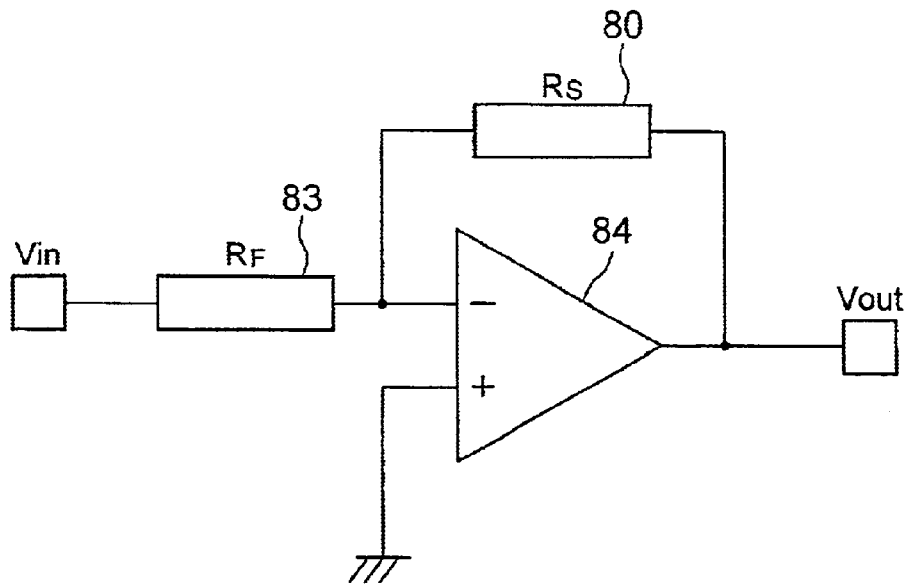
FIG. 2 is a circuit diagram of the amplifier installed in the infrared ray detector of FIG. 1.

Assuming an ideal case wherein the thermo-sensitive resistors are made of metal and the temperature coefficients of the resistances are equal between the sections 13 and 12, i.e., $\kappa_B = \kappa_R$, the output signal from the read circuit of FIG. 2 is expressed by equation (8). By fabricating the infrared ray detector so that the thermal time constants and the thermal conductances of both the non-sensitive section 13 and the sensitive section 12 respectively assume equal values, the terms including $\tau_{th}$ and $\Delta T_J$ are cancelled in the output signal between equations (11) and (12), whereby the output signal $V_{out}$ is expressed by:

$$V_{out} \propto \frac{R_{BO}}{R_{RO}} \exp(\kappa_B \Delta T_{OBJ}), \quad (14)$$

whereby only the output signal relating to the infrared ray irradiation from the object can be extracted.

On the other hand, if the thermo-sensitive resistor acts as a semiconductor element, the temperature dependency of the thermo-sensitive resistor is expressed by the following formula:

$$R = R_0 \exp\left(\frac{B}{T}\right), \quad (15)$$

wherein B is the B-constant of the thermistor bolometer. If the B-constants of both the non-sensitive section 13 and the sensitive section 12 are equal, the output signal $V_{out}$ from the read circuit of FIG. 2 is as follows:

$$V_{out} \propto \frac{R_F}{R_S} = \frac{R_B}{R_R} = \frac{R_{BO}}{R_{RO}} \exp\left(B\left(\frac{1}{T_B} - \frac{1}{T_R}\right)\right). \quad (16)$$

Although this equation (16) is somewhat more complicated than equation (14) provided in the case of the metallic resistor, the fluctuation of the ambient temperature and the influence by the Joule heat are cancelled, similarly to the case of the metallic resistor.

In short, in the thermo-sensitive infrared ray detector according to the embodiment of the present invention, the fluctuation of the ambient temperature and the influence by the Joule heat caused by the bias current can be cancelled between the temperature sensor 15a and the temperature sensor 15b, whereby only an output component relating to the temperature change caused by the infrared ray irradiation can be obtained.

Samples of the above embodiment were manufactured and compared with the comparative samples of the conventional device. First sample of the embodiment had an array of 320×240 pixels, and included temperature sensors 15a and 15b having a difference $\Delta C_{th}/C_{th}$ in the heat capacity therebetween which is less than 2%. The comparative sample for the first sample had a configuration similar to that of the first sample except that the infrared ray non-sensitive section 13 was formed directly on the silicon oxide film 25 formed on the substrate 23.

Figure 13:
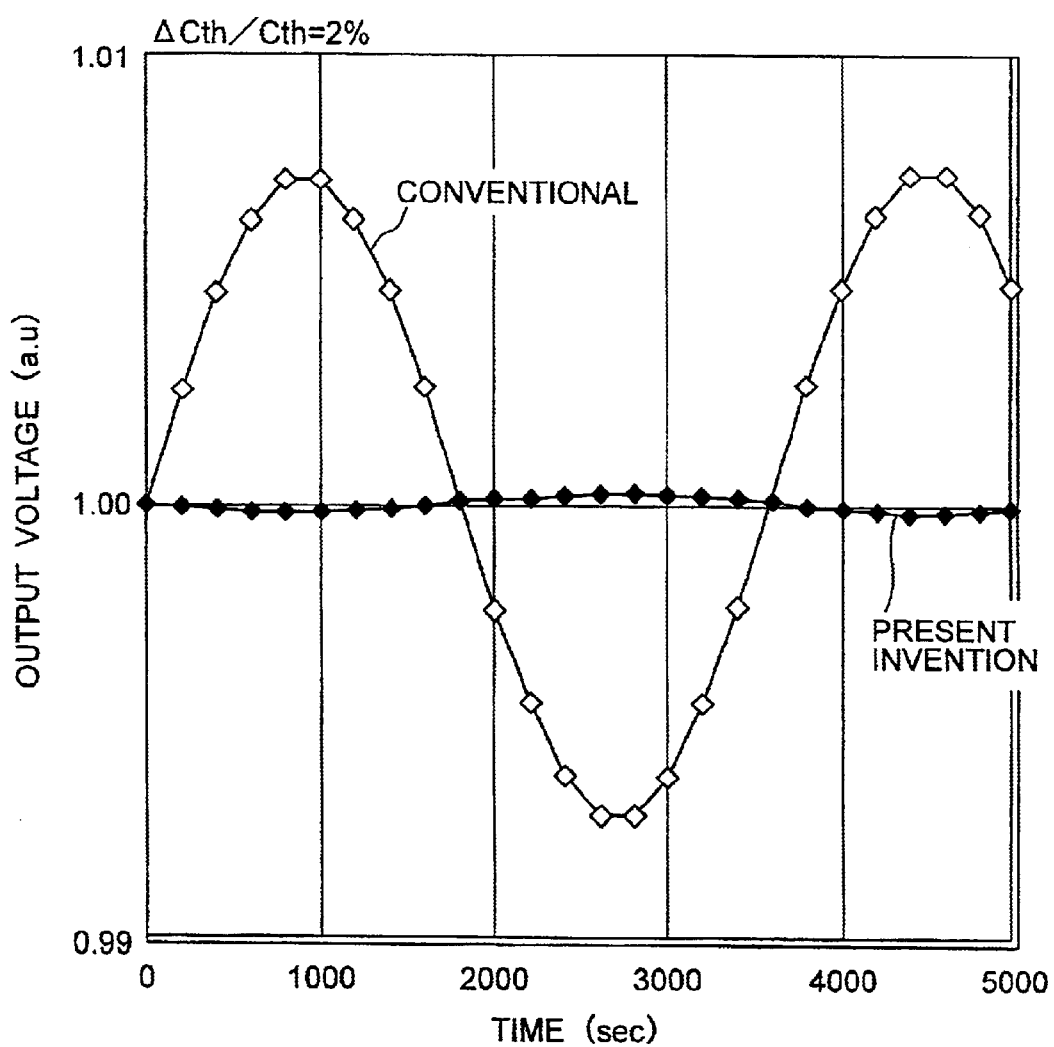
FIG. 13 is a graph depicting the output characteristics of samples of the embodiment and the conventional detector.

FIG. 13 shows the output voltage characteristics of the samples plotted in arbitrary unit with respect to time (second) in an ambient wherein the temperature fluctuated at a cycle of 1 hour within 2 degrees Celsius. The bias voltage had a fluctuation within 1 millivolts at a cycle of 1 hour. As understood from FIG. 8, the output voltage from the first sample of the embodiment had a peak-to-peak voltage fluctuation as low as 0.04%, the fluctuation being caused by the ambient temperature and the bias current. The comparative sample had a corresponding peak-to-peak voltage fluctuation of 1.44%, which was greater than that of the first sample by more than one order of the magnitude.

Figure 14:
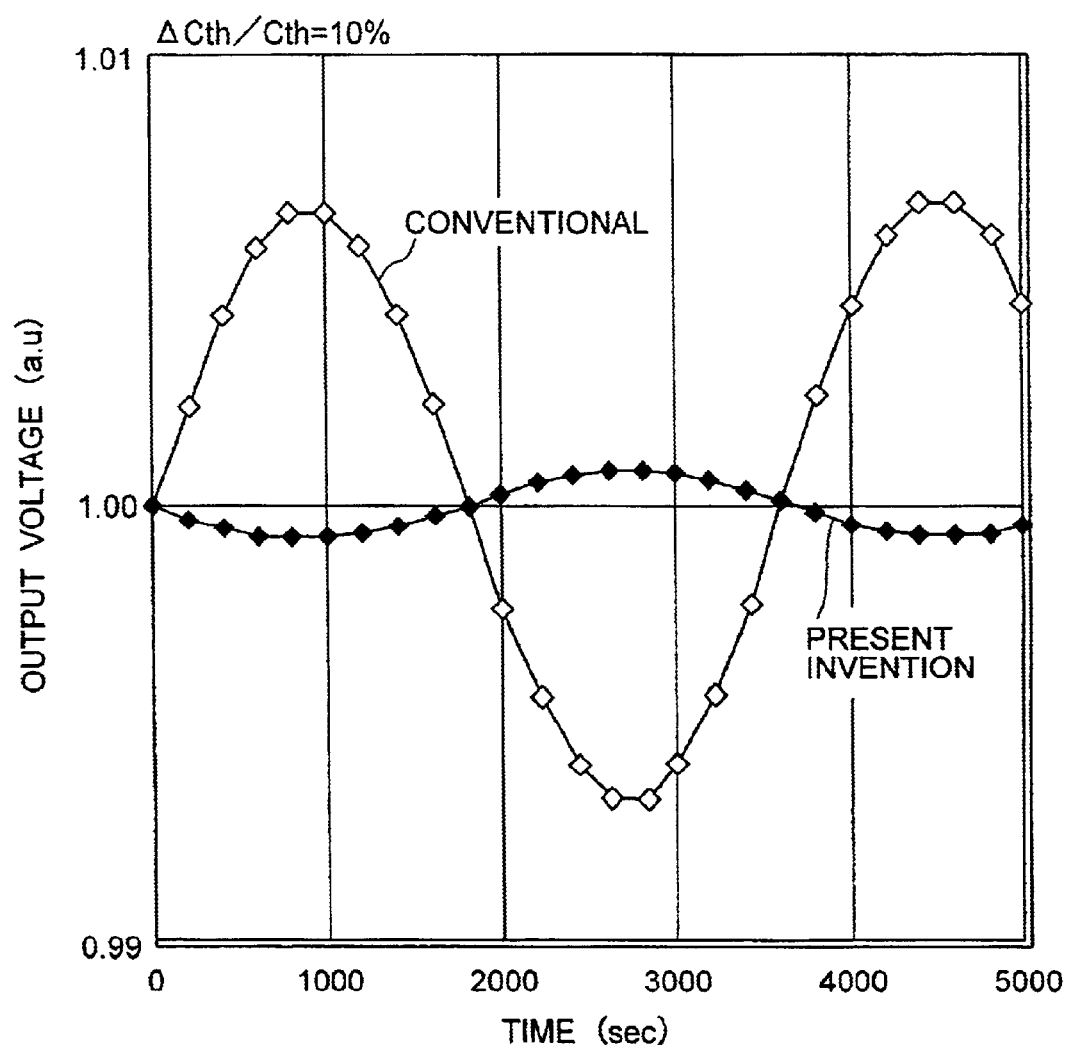
FIG. 14 is another graph depicting the output characteristics of other samples the embodiment and the conventional detector.
Figure 15:
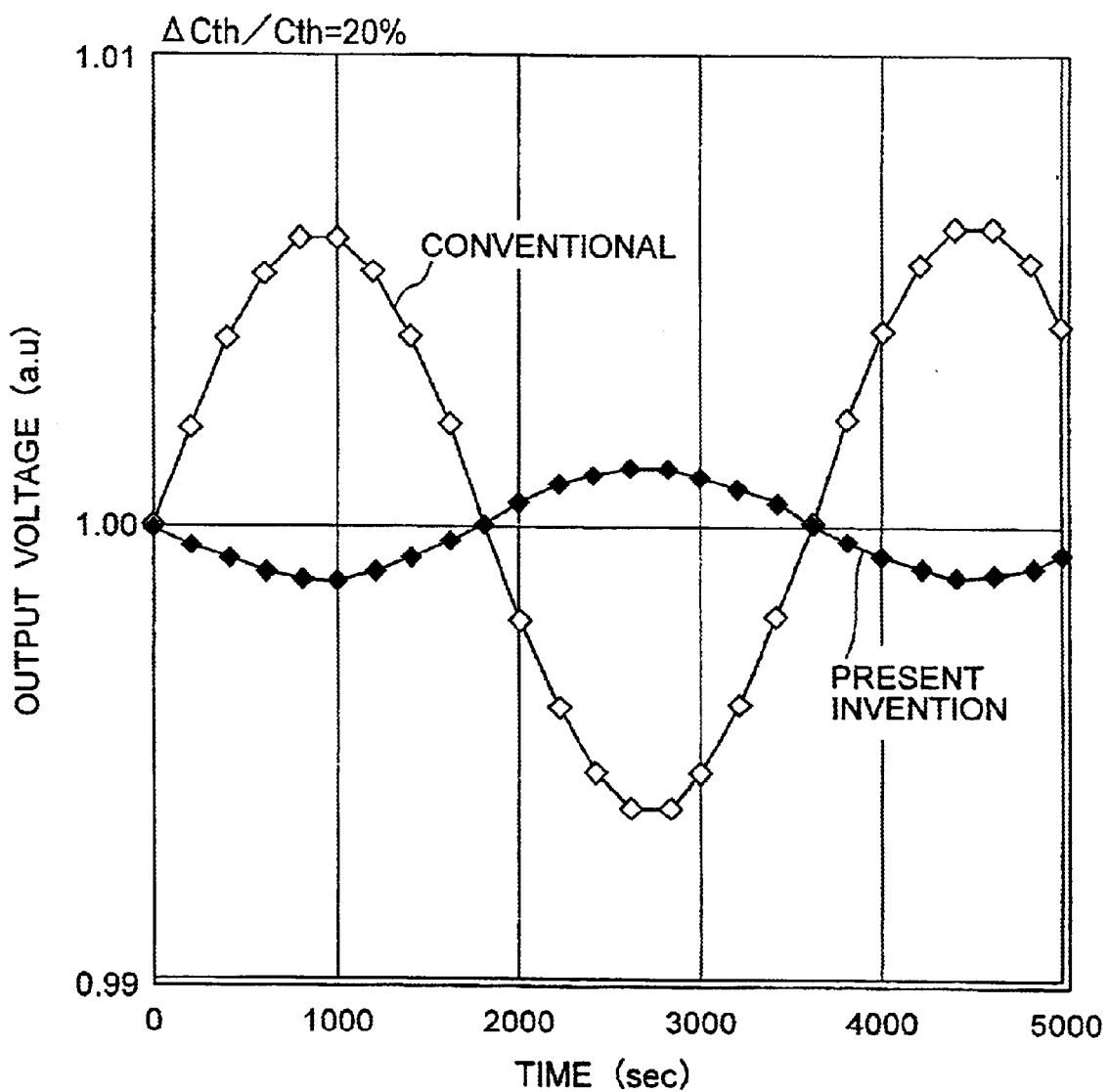
FIG. 15 is another graph depicting the output characteristics of samples of the embodiment and the conventional detector.

Second and third samples of the embodiment had differences $\Delta C_{th}/C_{th}$ in heat capacity between the temperature sensors 15a and 15b which were within 10% and 20%, respectively. Other conditions are similar to the case of the first sample. FIGS. 14 and 15 show the results of the measurements, exhibiting a peak-to-peak voltage fluctuations within 0.14% and 0.244%, respectively. These results mean that a larger difference in the heat capacity between the temperature sensors 15a and 15b results in a larger voltage fluctuation in the output of the detector caused by the fluctuation of the ambient temperature and influence of the bias current.

The allowable limit of the heat capacity between the temperature sensors 15a and 15b should be determined based on the overall characteristics of the infrared ray sensor including optical and electrical characteristics as well as on the process conditions. The experiments of the inventor exhibited that substantially no problem occurs if the fluctuation in the output voltage is within ⅕ of the fluctuation of the conventional detector such as shown in FIGS. 14 and 15. Thus, it is preferable that the difference in the heat capacity between the temperature sensors 15a and 15b be within ±10%.

The above embodiment and samples thereof are directed to the infrared ray detectors having thermo-sensitive resistors which operate as semiconductor elements. Another sample of embodiment was manufactured which had thermo-sensitive resistors made of metallic Ti film. The another sample was subjected to measurements similarly to the first through third samples. The Ti film had a meander route, a resistance of 5 kΩ and a temperature coefficient of resistance at 0.25%/K, and other configurations of the detector are similar to those of the thermo-sensitive resistors in FIG. 6. The results of the measurements exhibited an improvement of the output voltage fluctuation in the embodiment, wherein both the sensitive section 12 and the non-sensitive section 13 had a heat isolation structure, over the conventional detector by more than one order of magnitude.

Figure 3:
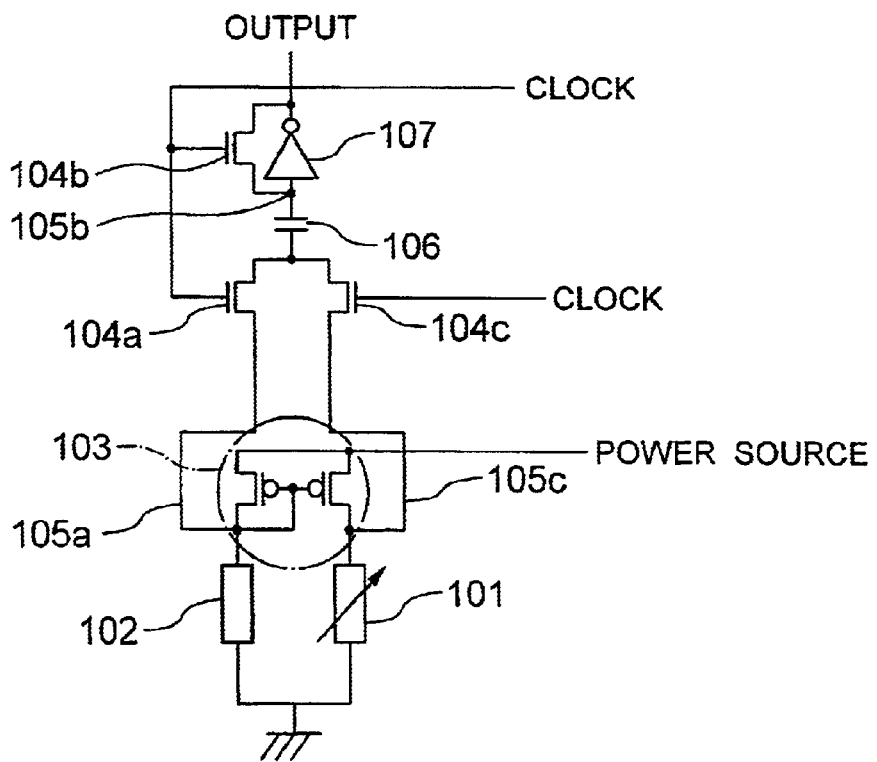
FIG. 3 is a circuit diagram of a read circuit used in another conventional infrared ray detector.
Figure 4:
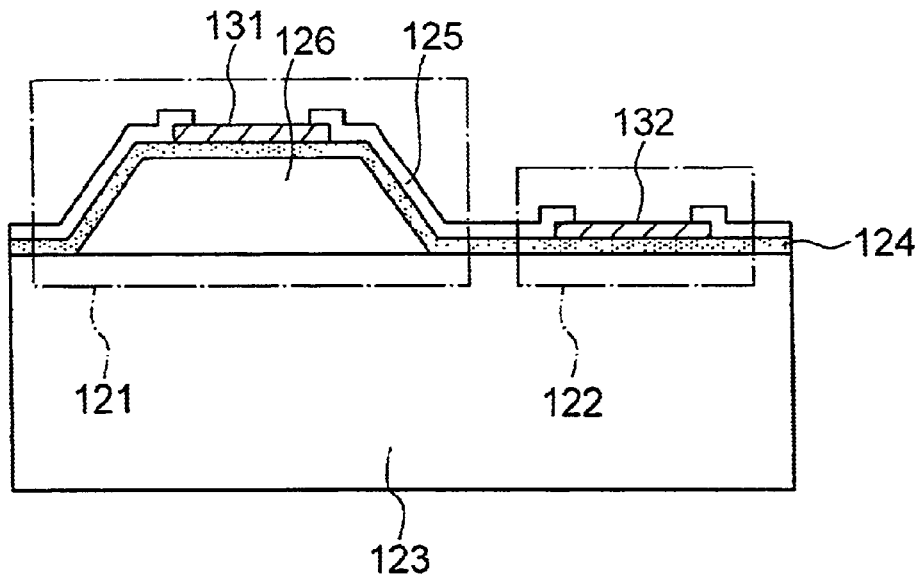
FIG. 4 is a sectional view of a pixel in the another conventional infrared ray detector.
Figure 5:
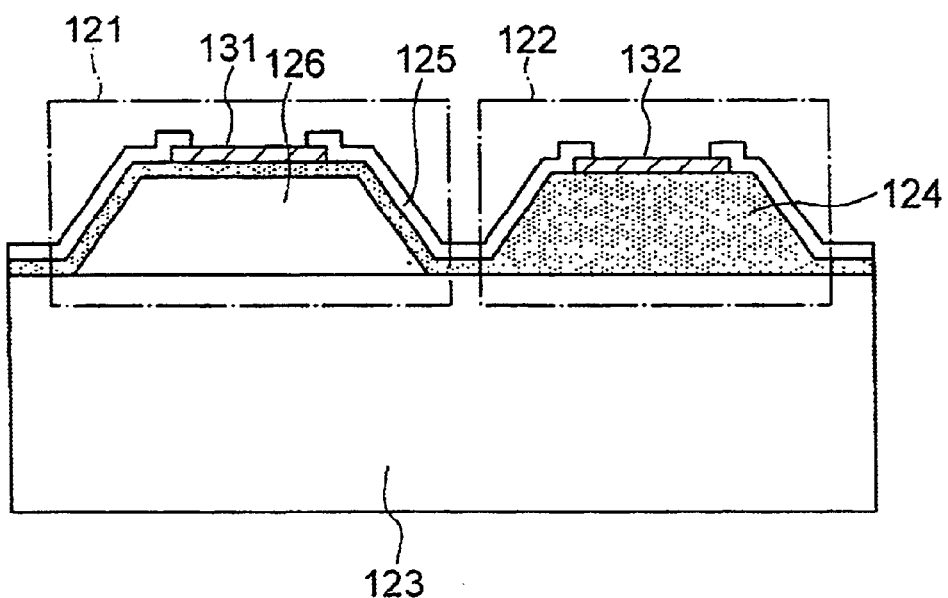
FIG. 5 is a sectional view of a modification of the pixel shown in FIG. 4.

In the above embodiments, the amplifier of FIG. 2 was exemplarily used. However, the read circuit of FIG. 3 may be used and provide similar results. In short, the read circuit in this case is such that the sensitive section 12 and the non-sensitive section 13 are connected in series and applied with a bias voltage to deliver an output voltage at the node connecting both the sections 13 and 12 together. In this case either, the output voltage $V_{out}$ is expressed by the ratio between the resistances of both the sections, although equation is different from that of the above samples.

In the above embodiment, the infrared ray reflection film 22 is disposed over the second temperature sensor 15b and the visors 14 are further disposed over the infrared ray reflection film 22 with a space therebetween. The visors 14 absorbs the infrared ray irradiated to the area of the non-sensitive section and improves the effective opening ratio of the infrared ray detector.

Figure 16A:
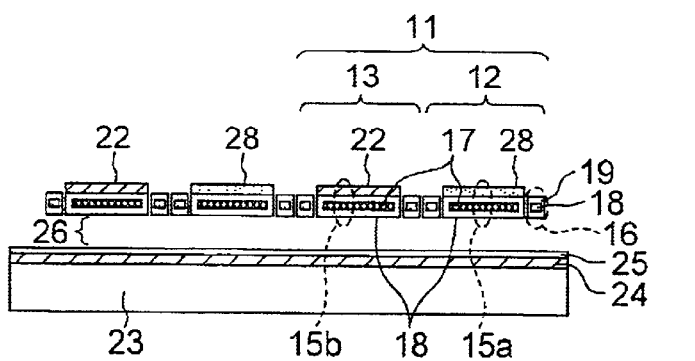
FIGS. 16A to 16E are sectional views of thermo-sensitive infrared ray detectors according to other embodiments of the present invention.

FIG. 16A shows another embodiment of the present invention wherein the visors 14 are omitted. In this embodiment, the protective film 18 encircling the bolometer film 17 of the first temperature sensor 15a is covered by another film 28 having a property of passing the infrared ray, thereby equalizing the temperature characteristics such as thermal time constant and thermal conductance between the temperature sensors 15a and 15b. In an alternative, the protective film 18 may have a larger thickness.

Figure 16B:
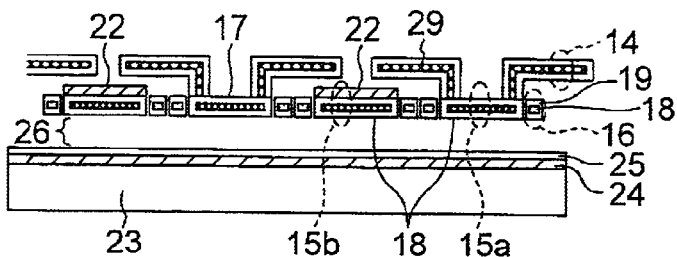

FIG. 16B shows another embodiment of the present invention wherein the visors 14 has a layered structure wherein a metallic film 29 made of a material such as used for the bolometer film 17 is encircled by the material for the body of the visors 14 shown in FIG. 6.

Figure 16C:
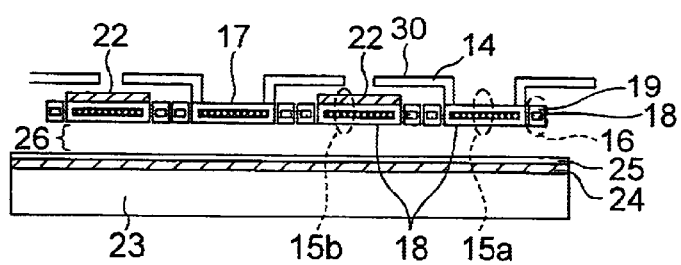

FIG. 16C shows another embodiment of the present invention wherein the visor 14 is covered by a metallic film 30 made of a material similar to that used in FIG. 16B.

Figure 16D:
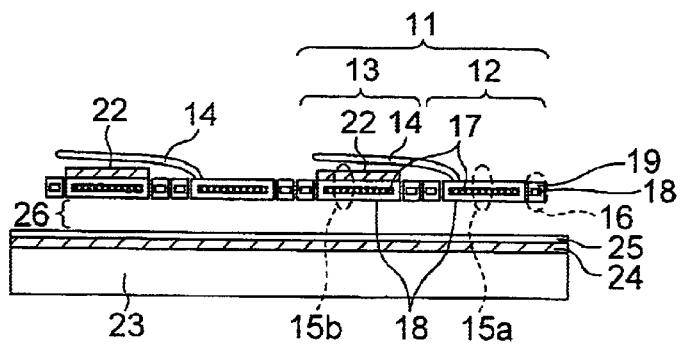

FIG. 16D shows another embodiment of the present invention wherein a single visor 14 extends from one of the edges of the temperature sensor 15a and overhangs the substantially entire area of the second temperature sensor 15b.

Figure 16E:
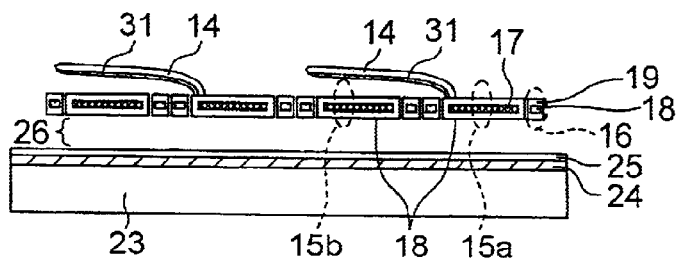

FIG. 16E shows a modification of the embodiment of FIG. 16D. In FIG. 16E, the single shield 14 such as shown in FIG. 16D includes an underlying metallic film 31 which intercepts the infrared ray, with the infrared ray reflector film 22 being omitted.

Since the above embodiments are described only for examples, the present invention is not limited to the above embodiments and various modifications or alterations can be easily made therefrom by those skilled in the art without departing from the scope of the present invention.

What is claimed is:

1. A thermo-sensitive infrared ray detector comprising a substrate, first and second sections formed on said substrate and including first and second thermo-sensitive resistors, respectively, said first and second thermo-sensitive resistors having similar dimensions and thermally isolated from one another and from said substrate, and a shield member for shielding said second thermo-sensitive resistor against infrared rays, wherein said shield member includes both an infrared ray reflector film and an infrared ray absorbing member.

2. The thermo-sensitive infrared ray detector as defined in claim 1, further comprising a read circuit for reading a difference signal representing a difference between output signals read from said first and second thermo-sensitive resistors.

3. The thermo-sensitive infrared ray detector as defined in claim 2, wherein read circuit supplies a bias current to each of said first and second thermo-sensitive resistors, and cancels self-heating signal components caused by said bias current in outputs from said first and second thermo-sensitive resistors.

4. The thermo-sensitive infrared ray detector as defined in claim 1, wherein said infrared ray reflector film includes Al, Ti, W or silicide of one of these materials.

5. The thermo-sensitive infrared ray detector as defined in claim 1, wherein said infrared ray absorbing member includes at least one of silicon nitride film, silicon oxide film, silicon carbide film and silicon oxy-nitride film.

6. The thermo-sensitive infrared ray detector as defined in claim 1, wherein said infrared absorbing member includes a thermo-sensitive resistor or a metallic film.

7. A The thermo-sensitive infrared ray detector as defined in claim 1, wherein a difference in a heat capacity between said first section and said second section is within 10%.

8. The thermo-sensitive infrared ray detector as defined in claim 1, wherein said first and second sections forms a pixel, and a plurality of said pixels are arranged in an array on said substrate.

9. The thermo-sensitive infrared ray detector as defined in claim 1, wherein said infrared ray absorbing member overhangs said second thermo-sensitive resistor, and is thermally coupled to said first thermo-sensitive resistor.

10. The thermo-sensitive infrared ray detector as defined in claim 9, wherein a pair of said infrared ray absorbing members extending from adjacent first thermo-sensitive resistors overhang said second thermo-sensitive resistor disposed therebetween.

11. A thermo-sensitive infrared ray detector comprising a substrate, first and second sections formed on said substrate and including first and second thermo-sensitive resistors, respectively, said first and second thermo-sensitive resistors having similar dimensions and thermally isolated from one another and from said substrate, and a shield member for shielding said second thermo-sensitive resistor against infrared rays, wherein said shield member includes an infrared ray absorbing member that overhangs said second thermo-sensitive resistor and is thermally coupled to said first thermo-sensitive resistor.

* * * * *